United States Patent [19]
Ueno et al.

[11] 3,760,079
[45] Sept. 18, 1973

[54] METHOD FOR PROTECTING CHICKENS AND HOGS FROM PASTEURELLA

[75] Inventors: Ryuzo Ueno, Nishinomiya; Shota Watanabe, Takarazuka; Sotoyuki Ota, Nishinomiya, all of Japan

[73] Assignee: Kabushiki Kaisha Ueno Seiyaku Oyo Kenkyujo, Osaka, Japan

[22] Filed: Jan. 5, 1971

[21] Appl. No.: 104,156

[52] U.S. Cl. .............................. 424/272
[51] Int. Cl. .............................. A61k 27/00
[58] Field of Search.............. 424/272; 260/240 A, 260/240.1

[56] References Cited
UNITED STATES PATENTS
3,574,202   4/1971   Hirao et al...................... 424/272

*Primary Examiner*—Sam Rosen
*Attorney*—Sherman & Shalloway

[57] ABSTRACT

A method of protecting fowl and hogs from *Pasteurella* which comprises administering an effective dose of a compound of the formula

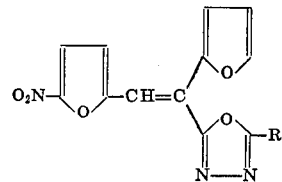

in which R is a member of the group consisting of hydrogen and a tetrahydrofurylacetylamino radical, to the fowl or hogs to be protected.

4 Claims, No Drawings

METHOD FOR PROTECTING CHICKENS AND HOGS FROM PASTEURELLA

This invention relates to a method for protecting fowl and hogs from microorganisms of the *Pasteurella* species. More particularly, the invention relates to a method of protecting fowl and hogs from microorganisms of the *Pasteurella* species, by administering to them an effective dose of a compound of the formula

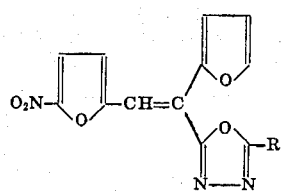

in which R is a member of the group consisting of hydrogen and a tetrahydrofurylacetylamino radical.

Domestic fowl and animals are susceptible to infections with various germs during their growth, and are suceptible to being taken ill. When fowl or chickens are infected with *Pasteurella multocida* there is a high mortality rate. Also hogs are apt to be infected with microorganisms of the *Pasteurella* species, for example, *Pasteurella multocida*, and fall into subacute or chronic disease. It is now found that the above-specified compounds exhibit very effective preventive and therapeutic action to the fowl and hogs which are infected with microorganisms of the *Pasteurella* species.

The specified compounds exhibit remarkably effective antibacterial action against microorganisms of the *Pasteurella* species, e.g., *Past. hemolytica*, *Past. multocida*, *Past. pestis* and *Past. tularensis*, inter alia, *Past. multocida*.

The effective doses of the compounds can be used in combination with various known carriers and/or adjuvants in accordance with the accepted practice. In a particularly preferred embodiment, a powder medicine containing 2 to 10 percent by weight of either of the specified compounds as the effective ingredient, is mixed with a filling agent such as corn meal, lactose, starch, talc, etc., and is added to the feed of chickens and hogs. It may also be conveniently administered in the form of liquid medicine, together with a wetting agent, solubilizing agent, surface active agent, e.g., polyoxyethylene glycol, CMC, glycerine, etc., or suspension such as acacia.

The effective dose of the compound ranges normally from 10 to 200 mg, preferably 50 – 180 mg. When it is added to chicken or hog feed, respectively 0.005 – 0.01 wt. percent, and 0.01 – 0.02 wt. percent, based on the weight of the feed, is conveniently used.

The period of administration of the compound varies, depending on the seriousness of symptoms, while normally continuous administration of approximately 7 to 30 days is sufficient. The effect of the compound becomes appreciable from the 4th to 5th day after the first administration. Thus the compounds very effectively protect chickens and hogs from diseases caused by microorganisms of the *Pasteurella* species.

The melting points and the minimum inhibiting concentrations (IMC) in vitro against *Pasteurella multocida* of the subject compounds are shown in Table 1 below. From the data it should be understood that the compounds possess very strong antibacterial action.

TABLE 1.—THE MINIMUM INHIBITING CONCENTRATION (IN VITRO)

| Microorganism | R:H Melting point: 133–4° C. Appearance: yellow, columnar crystal. | R:—COCH$_2$-[tetrahydrofuryl] Melting point: 164.5–165.5° C. Appearance: yellow, needle-like crystal. |
|---|---|---|
| *Pasteurella multocida* | 4.0 | 1.0 |

The minimum inhibiting concentration was determined in the following manner. To tryptosoybouillon (the tryptosoybouillon being obtained by dissolving 17 g of tripton, 3 g of soypeptone, 2.5 g of glucose, 2.5 g of potassium hydrogenphosphate, and 5 g of sodium chloride in 1 liter of water, which had a pH of 7.3), cow's serum was added in an amount of 10 percent by volume based on the volume of the tryptosoybouillon. Separately, the compound of the invention was dissolved in dimethylsulfoxide, and the solution was added to the above medium at a ratio of 2 volume percent based on the latter, i.e., 25 $\gamma$/ml. of the medium. The medium was diluted to various concentrations in conventional manner. To 2 ml of media containing various concentrations of active ingredient a drop of the germ liquid (cultured for 20 hours in an initially prepared medium free of the active compound of the invention) were inoculated with a syringe and incubated at 37°C for 48 hours. Thereafter the turbidity of each medium was checked to judge if the germs propagated.

It has been proven through the experiments with mice that the subject compounds are extremely stable and show substantial activity when they are administered to animals. When the compounds are orally administered to C3H type mice of approximately 18 grams each in body weight, which were artificially infected with *Pasteurella multocida* inoculated into their abdominal cavities, the median effective doses (ED50) were as given in Table 2 below. From the table, it can be clearly understood that the effect of the compounds is notably better than that of analogous compounds having —NH$_2$ or —NHCOCH$_3$ at the second position of the oxadiazole ring.

TABLE 2.—ED$_{50}$ WITH PASTEURELLA MULTOCIDA-INFECTED MICE

| Compound | | Administered dose (mg./kg.)— | | | | |
|---|---|---|---|---|---|---|
| | | 800 | 400 | 200 | 100 | 50 |
| Subject compound $O_2N-\text{furan}-CH=C-\text{oxadiazole}$ | Survived mice/tested mice | | 5/5 | 3/5 | 1/5 | 0/5 |
| | ED$_{50}$ (mg./kg.) | | | 168 | | |
| Subject compound $O_2N-\text{furan}-CH=C-\text{oxadiazole}-NHCOCH_2-\text{furan(H)}$ | Survived mice/tested mice | | 5/5 | 5/5 | 1/5 | |
| | ED$_{50}$ (mg./kg.) | | | 68 | | |
| Control compound $O_2N-\text{furan}-CH=C-\text{oxadiazole}-NH_2$ | Survived mice/tested mice | 5/5 | 2/5 | 0/5 | 0/5 | |
| | ED$_{50}$ (mg./kg.) | | 466 | | | |
| Control compound $O_2N-\text{furan}-CH=C-\text{oxadiazole}-NHCOCH_3$ | Survived mice/tested mice | 0/5 | 0/5 | 0/5 | | |
| | ED$_{50}$ (mg./kg.) | | >800 | | | |

The manner of measurement and determination of ED50 was as follows: *Pasteurella multocida* p-1059 was cultured in tryptosoybouillon containing 5 percent of rabbit's blood for 20 hours at 37°C., and 0.2 ml each of $10^{-6}$ dilution was inoculated into the abdominal cavity of a mouse (4 weeks old, weighing 15 – 18 g).

Immediately after the inoculation, the dosage of each compound to be administered was ground in an agate mortar, suspended with acacia, and 0.4 ml thereof per mouse was orally administered. One test group consisted of five mice.

From the number of mice surviving after 5 days from an inoculation, ED50 was calculated according to the Behrens-Kaerber method.

The compounds of the subject invention are further found to possess excellent properties as follows:

Generally nitrofuran derivatives are sparingly soluble in water, and when orally administered to animals, their absorption through the intestines is low. Consequently, only a minor percentage of the administered compound migrates into the blood of the animals. On the contrary, the compounds of the invention have higher solubilities in water than known nitrofuran derivatives, and can migrate into blood of the administered animals at higher concentrations. In Table 3 below, the solubilities of subject compounds, and their concentrations in blood of rats which had been orally administered with the compounds are compared with the similar data of analogous compounds.

TABLE 3.—CONCENTRATION IN RAT'S BLOOD (γ/ml.)

| Compound | Solubility | Hours after the compound's administration— | | | | | |
|---|---|---|---|---|---|---|---|
| | | 0 | 2 | 3 | 8 | 24 | 48 |
| Subject compound $O_2N-\text{furan}-CH=C-\text{oxadiazole}$ | 28.2 | 0 | 0.15 | 0.12 | 0.08 | 0.02 | <0.016 |
| Subject compound $O_2N-\text{furan}-CH=C-\text{oxadiazole}-NHCOCH_2-\text{furan(H)}$ | 11.0 | 0 | 6.3 | 5.6 | 2.1 | <0.06 | <0.06 |
| Control compound $O_2N-\text{furan}-CH=C-\text{oxadiazole}-NH_2$ | 3.2 | 0 | 0.03 | 0.027 | 0.04 | 0.024 | <0.016 |
| Control compound $O_2N-\text{furan}-CH=C-\text{oxadiazole}-NHCOCH_3$ | 7.5 | 0 | 0.025 | 0.02 | 0.016 | <0.016 | <0.016 |

The concentration in blood was measured as follows:

Each of the compounds was suspended in 5 percent acacia at a ratio of 10 mg/ml, and orally administered to male rats weighing approximately 150 g each, at a dose of 100 mg/kg. At 2, 3, 8, 24, and 48 hours after the administration, the rats were anesthetized with ether, and their blood was extracted from the heart with a syringe. One test group consisted of three rats. The blood was centrifuged after coagulation, and the serum as the supernatant was separated and stored at −20°C.

The concentration of each compound in the serum was determined by means of bioassay. The bioassay medium (which was prepared by dissolving 0.6 percent of peptone, 0.3 percent of yeast extract, 0.15 percent of meat extract, and 1 percent of agar in distilled water, and adjusting the pH of the solution to 7.0) was sterilized and maintained at 50°C. To such medium, 2ml of 1 percent $NaNO_3$, 3.8 ml of 0.1 percent Methylene Blue, and 0.2 ml of test germ liquid (which was prepared by culturing Escherichia coli 8057 in normal bouillon for 20 hours at 37°C.), per 100 ml of the medium, were added and mixed, and 2 ml samples of the mixture were poured into test tubes of 7 mm in inner diameter. The culture medium was allowed to coagulate by standing at room temperature for approximately 30 minutes. On each medium in the test tubes, 0.2 ml each of standard dilution of the test compound at various concentrations (16, 8, 4, 2, 1, 0.5, 0.25, 0.125, 0.0062, 0.031, 0.016, and 0.008 γ/ml ) was superposed, (one sample was superposed in three test tubes.) Thereafter the compound was allowed to penetrate into the medium while being kept in a refrigerator for 2 hours, followed by an overnight incubating at 37°C. The length of the inhibition zone, in which the Methylene Blue was not reduced, in all the test tubes was measured to draw a standard curve, and from the standard curve the concentration of the compound in each serum was calculated.

Furthermore, the median lethal doses (LD50) of the subject compounds are extremely high thereby persuasively demonstrating the very high safety of the compounds.

The median lethal doses of the subject compounds suspended in 5 percent aqueous solution of acacia, when orally administered to C3H type mice of each approximately 18 g in body weight, were as given in Table 4 below. The data prove the very low toxicity of the compounds studied.

TABLE 4.—TOXICITY

| Compound | $LD_{50}$, mg./kg. |
| --- | --- |
| $O_2N-\text{[furan]}-CH=C-\text{[oxadiazole]}$ | 1.373 |
| $O_2N-\text{[furan]}-CH=C-\text{[oxadiazole]}-CHCOCH_2-\text{[furan]}$ H | 1.646 |

As described above, the subject compounds not only exhibit substantial antibacterial activity in vitro, but also prevent Pasteurella multocida infection when administered to chickens and hogs, much more effectively than the analogous nitrofuran derivatives. Furthermore, the compounds produce immediate effect, have very low toxicity, and therefore have broad safety margins. Thus the compounds can very effectively protect chickens and hogs from the infection with Pasteurella.

EXAMPLE 1

The subject compounds were added to the feed of 14 day-old chickens. Each test group consisted of 10 chickens On the second day of the administration, 0.2 ml of $10^{-4}$ dilute inoculum of Pasteurella multocida cultured in tryptosoy broth containing 10 percent of rabbit's blood for 24 hours was inoculated into each chicken by means of intramuscular injection in the left leg. The administration of subject compound was continued for 5 days following the inoculation, and the compound's effect was evaluated by the ratio of chickens that survived. The results were as shown in Table 5 below. It is seen that the chickens fed with the feed containing 0.01 percent of the subject compounds were protected from infection and survived by 100 percent and 90 percent, while those fed with the feed containing 0.005 percent of either of the compounds, by 60 percent. In clear contrast, the chickens administered with known control compounds were all infected and died.

EXAMPLE 2

Young mongrel pigs of Berkshire origin which were to be sold as soon as their body weights reached 90 Kg each were continuously administered with the subject compound contained in their feed in an amount of 0.015 percent.

Thirty pigs were selected from those borne on the same day from four sows and divided into three test groups, each group consisting of 10 pigs.

The test started on the 73rd day from their birth, and the number of days required for them to reach 90 Kg was studied as was the feed conversion and lung lesion, of the pigs. It was confirmed as the result of the studies that the pigs which were administered with the subject compounds showed excellent achievement over the control groups fed with control compounds.

It was confirmed that the number of days required for the pigs to weigh 90 Kg was less with the test groups fed with the subject compounds. The macro examination of the lugs of the pigs upon pathological anatomy of the pigs after slaughtering confirmed the substanial effect of the subject compounds, since the lesions in the lungs were less with the treated groups than with the control groups.

Furthermore, upon bacteriological study of the pigs, microorganisms of the Pasteurella species were detected from the pigs of the control groups, but none was detected from the lungs of the test groups administered with the subject compounds.

TABLE 5

| Compound | Addition to feed, percent | Number of tested chickens | Number of survived chickens,[1] percent |
|---|---|---|---|
| Subject compound 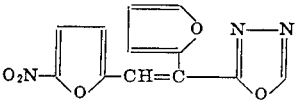 | 0.01<br>0.005 | 10<br>10 | 100<br>60 |
| Subject compound 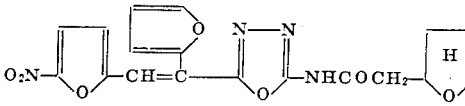 | 0.01<br>0.005 | 10<br>10 | 90<br>60 |
| Control compound 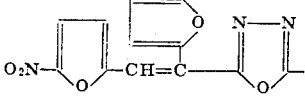 | 0.01<br>0.005 | 10<br>10 | 0<br>0 |
| Control compound 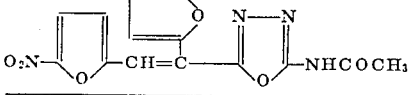 | 0.1<br>0.005 | 10<br>10 | 0<br>0 |

[1] After 5 days of administration.

TABLE 6

| | Subject compound 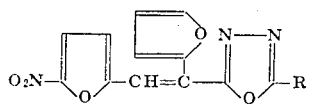<br>R:H<br>R:NHCOCH₂— | | Control compound 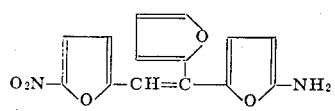 | Basic feed |
|---|---|---|---|---|
| Quantity added to the feed, percent | 0.015 | 0.015 | 0.015 | 0 |
| Number of tested pigs | 10(♀6, ♂4) | 10(♀6, ♂4) | 10(♀6, ♂4) | 10(♀6, ♂4) |
| Average number of days from birth: | | | | |
| Beginning | 73 | 73 | 73 | 73 |
| End | 168±6.2 | 169±7.0 | 172±7.5 | 183±7.4 |
| Number of days required for increasing pig's weight to 90 kg. each | 95±6.3 | 96±6.8 | 99±7.5 | 110±7.4 |
| Average body weight (kg.): | | | | |
| Beginning | 20.6±3.5 | 20.5±3.8 | 20.5±3.6 | 20.5±4.2 |
| Ending day | 90.2 | 90.2 | 90.1 | 90.3 |
| Average body weight increase per day (g.) | 732.63 | 726.04 | 703.03 | 634.54 |
| Average feed consumption per pig (kg.) | 211.68 | 218.60 | 219.94 | 242.90 |
| Feed conversion | 3.04 | 3.14 | 3.16 | 3.48 |
| Lesion in lung: | | | | |
| Serious | 1 | 2 | 4 | 6 |
| Medium | 1 | 1 | 2 | 1 |
| Slight | 3 | 1 | 1 | 0 |
| Normal | 5 | 6 | 2 | 3 |

We claim:

1. A method of protecting chickens and hogs from microorganisms of the Pasteurella species which comprises orally administering to said chickens and hogs an effective dose of a compound of the formula,

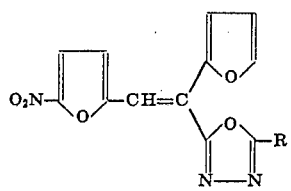

wherein R is a member of the group consisting of hydrogen and a tetrahydro-furylacetylamino radical.

2. The method of claim 1, wherein the effective dose ranges from 10 to 200-mg.

3. The method of claim 1, wherein the compound is administered in the animal feed.

4. The method of claim 1, wherein the microorganisms of the *Pasteurella* species are *Pasteurella multocida*.